United States Patent
Yanagisawa et al.

(10) Patent No.: US 11,310,969 B2
(45) Date of Patent: Apr. 26, 2022

(54) EMITTER AND DRIP IRRIGATION TUBE

(71) Applicant: Enplas Corporation, Saitama (JP)

(72) Inventors: Kazuma Yanagisawa, Saitama (JP); Koki Ono, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/059,230

(22) PCT Filed: May 22, 2019

(86) PCT No.: PCT/JP2019/020264
§ 371 (c)(1),
(2) Date: Nov. 26, 2020

(87) PCT Pub. No.: WO2019/230519
PCT Pub. Date: Dec. 5, 2019

(65) Prior Publication Data
US 2021/0204494 A1    Jul. 8, 2021

(30) Foreign Application Priority Data

May 28, 2018 (JP) .............................. JP2018-101332

(51) Int. Cl.
*A01G 25/02* (2006.01)
(52) U.S. Cl.
CPC .................................. *A01G 25/023* (2013.01)
(58) Field of Classification Search
CPC ....... A01G 25/02; A01G 25/023; Y02A 40/22
See application file for complete search history.

(56) References Cited

U.S. PATENT DOCUMENTS

| 4,210,287 A | * | 7/1980 | Mehoudar | ............ | A01G 25/023 239/542 |
| 5,413,282 A | * | 5/1995 | Boswell | ............... | A01G 25/023 239/542 |

(Continued)

FOREIGN PATENT DOCUMENTS

| WO | WO 2017/093882 | 6/2017 |
| WO | WO 2019/230519 | 12/2019 |

OTHER PUBLICATIONS

International Search Report and the Written Opinion dated Aug. 13, 2019 From the International Searching Authority Re. Application No. PCT/JP2019/020264 and Its Translation of Search Report Into English. (8 Pages).

*Primary Examiner* — Joseph A Greenlund

(57) ABSTRACT

This emitter has an emitter body and a pedestal. The emitter body includes: a water intake part for introducing irrigation liquid; a pressure reducing flow passage groove which is for forming a pressure reducing flow passage which communicates with the water intake part and allows the irrigation liquid to flow out while reducing the pressure of the irrigation liquid; an accommodation part which communicates with the pressure reducing flow passage groove and into which the irrigation liquid flows while the pedestal is accommodated therein; and a flexible diaphragm part which approaches the pedestal upon receiving the pressure of the irrigation liquid inside a tube while the pedestal is accommodated in the accommodation part. The pedestal has through-holes for discharging the irrigation liquid that flowed into the accommodation part. The emitter body and the pedestal are connected through a hinge part.

5 Claims, 7 Drawing Sheets

(56) References Cited

U.S. PATENT DOCUMENTS

| | | | | |
|---|---|---|---|---|
| 5,443,212 A * | 8/1995 | Dinur | A01G 25/023 | 239/542 |
| 5,711,482 A * | 1/1998 | Yu | A01G 25/023 | 239/11 |
| 5,820,028 A * | 10/1998 | Dinur | A01G 25/023 | 239/542 |
| 6,027,048 A * | 2/2000 | Mehoudar | A01G 25/023 | 239/542 |
| 6,095,185 A * | 8/2000 | Rosenberg | A01G 25/023 | 137/512.15 |
| 6,250,571 B1 * | 6/2001 | Cohen | A01G 25/023 | 239/542 |
| 6,302,338 B1 * | 10/2001 | Cohen | A01G 25/023 | 239/542 |
| 6,343,616 B1 * | 2/2002 | Houtchens | F16L 41/06 | 137/318 |
| 6,568,607 B2 * | 5/2003 | Boswell | A01G 25/023 | 239/542 |
| 6,945,476 B2 * | 9/2005 | Giuffre | A01G 25/023 | 239/542 |
| 7,648,085 B2 * | 1/2010 | Mavrakis | A01G 25/023 | 239/542 |
| 8,302,887 B2 * | 11/2012 | Park | A01G 25/023 | 239/542 |
| 8,511,585 B2 * | 8/2013 | Keren | A01G 25/023 | 239/542 |
| 8,998,113 B2 * | 4/2015 | Keren | A01G 25/023 | 239/542 |
| 9,345,205 B2 * | 5/2016 | Kidachi | A01G 25/023 | |
| 9,668,430 B2 * | 6/2017 | Cohen | B05B 15/522 | |
| 9,743,595 B2 * | 8/2017 | Mavrakis | A01G 25/06 | |
| 9,872,444 B2 * | 1/2018 | Turk | A01G 25/023 | |
| 9,943,045 B2 * | 4/2018 | Kidachi | A01G 25/023 | |
| 9,980,443 B2 * | 5/2018 | Kidachi | B05B 12/088 | |
| 10,626,998 B2 * | 4/2020 | Rulli | A01G 25/023 | |
| 2005/0284966 A1 * | 12/2005 | DeFrank | A01G 25/023 | 239/542 |
| 2006/0169805 A1 * | 8/2006 | Dabir | A01G 25/023 | 239/542 |
| 2012/0160926 A1 * | 6/2012 | Lutzki | A01G 25/023 | 239/11 |
| 2014/0374502 A1 * | 12/2014 | Nourian | A01G 25/023 | 239/11 |
| 2015/0250111 A1 * | 9/2015 | Kidachi | B05B 1/14 | 239/542 |
| 2015/0319940 A1 * | 11/2015 | Kidachi | A01G 25/023 | 239/542 |
| 2016/0057947 A1 * | 3/2016 | Ensworth | A01G 25/023 | 239/542 |
| 2016/0205878 A1 * | 7/2016 | Kidachi | A01G 25/023 | |
| 2016/0286741 A1 * | 10/2016 | Kidachi | B05B 1/202 | |
| 2016/0286742 A1 * | 10/2016 | Kidachi | A01G 25/023 | |
| 2016/0295816 A1 * | 10/2016 | Kidachi | A01G 25/023 | |
| 2016/0330917 A1 * | 11/2016 | Kidachi | A01G 25/023 | |
| 2017/0035005 A1 * | 2/2017 | Kidachi | A01G 25/16 | |
| 2018/0098514 A1 * | 4/2018 | Socolsky | A01G 25/023 | |
| 2018/0338434 A1 * | 11/2018 | Wlassich | A01G 25/023 | |
| 2020/0288653 A1 * | 9/2020 | Socolsky | A01G 25/023 | |

* cited by examiner

EMITTER AND DRIP IRRIGATION TUBE

TECHNICAL FIELD

The present invention relates to an emitter and a drip irrigation tube including the emitter.

BACKGROUND ART

In the related art, drip irrigation is known as a method of growing plants. The drip irrigation method is a method in which drip irrigation tubes are placed in the soil where plants are planted and irrigation liquid such as water or liquid fertilizer is dripped from the drip irrigation tubes into the soil. In recent years, drip irrigation methods have received particular attention because of their ability to minimize the consumption of liquid for irrigation.

A drip irrigation tube has a tube with a plurality of through holes through which the irrigation liquid is discharged, and a plurality of emitters (also referred to as "drippers") joined to the inner surface of that tube to discharge the irrigation liquid from each through hole (see, for example, PTL 1).

PTL 1 discloses an emitter including a body and a flap that is movable about a hinge with respect to the body. This flap is formed of a material that is similar to or preferably the same as the material of the body. In addition, this flap includes a film (diaphragm) disposed in a frame. In an operational state with the emitter that has been assembled, a recess of the body is covered with the film of the flap turned about the hinge. The recess is formed in the body with a rim provided in a frame housing as a peripheral portion. When the film of the flap is pressed against the rim, a pressure adjustment chamber is formed. The flow rate of liquid that flows out of the pressure adjustment chamber is adjusted by elastic deflection of the film in accordance with pressure variation.

CITATION LIST

Patent Literature

PTL 1
WO 2017/093882

SUMMARY OF INVENTION

Technical Problem

In the emitter disclosed in PTL 1, the flap and the body are integrally molded in one piece in the state where the flap is open. Then, when the recess formed in the body is covered with the film of the flap, the pressure adjustment chamber that adjusts the flow rate of the liquid discharged from the emitter is formed. As such, to set the emitter to the operative state, it is necessary to perform multiple processes such as a process of turning the flap about the hinge, and a process of coupling the turned flap to the body by chemical bonding or heat welding. Since such multiple processes increase the production cost of the emitter, the production cost is desirably reduced. In particular, since the process of coupling the flap to the body by bonding, welding or the like largely increases the production cost, an emitter that does not require bonding, welding or the like in the production process is desired.

An object of the present invention is to provide an emitter and a drip irrigation tube that can reduce the production cost.

Solution to Problem

An emitter according to an embodiment of the present invention is configured to be joined to an inner wall surface of a tube for delivering irrigation liquid at a position corresponding to a discharging port communicating between inside and outside of the tube, the emitter being configured to quantitatively discharge the irrigation liquid in the tube from the discharging port to the outside of the tube, the emitter including: an emitter body; and a base seat configured to be housed in the emitter body. The emitter body includes: an intake part configured to take in the irrigation liquid, a pressure reducing channel groove communicated with the intake part and configured to form a pressure reducing channel for carrying the irrigation liquid while depressurizing the irrigation liquid, a housing part communicated with the pressure reducing channel groove and configured to house the base seat, and a diaphragm part having flexibility and configured to approach the base seat when receiving a pressure of the irrigation liquid in the tube in a state where the base seat is housed in the housing part. The base seat includes a through hole configured to discharge, toward the discharging port, the irrigation liquid carried into the housing part from the pressure reducing channel groove. The emitter body and the base seat are connected to each other through a hinge part.

A drip irrigation tube according to an embodiment of the present invention includes a tube including a discharging port configured to discharge irrigation liquid; and the emitter according to any one of claims 1 to 4 that is joined to an inner wall surface of the tube at a position corresponding to the discharging port.

Advantageous Effects of Invention

According to the present invention, an emitter and a drip irrigation tube that can reduce the production cost can be provided.

DESCRIPTION OF EMBODIMENTS

An embodiment of the present invention will be elaborated below with reference to the accompanying drawings.

Configurations of Drip Irrigation Tube and Emitter

Figure 1:
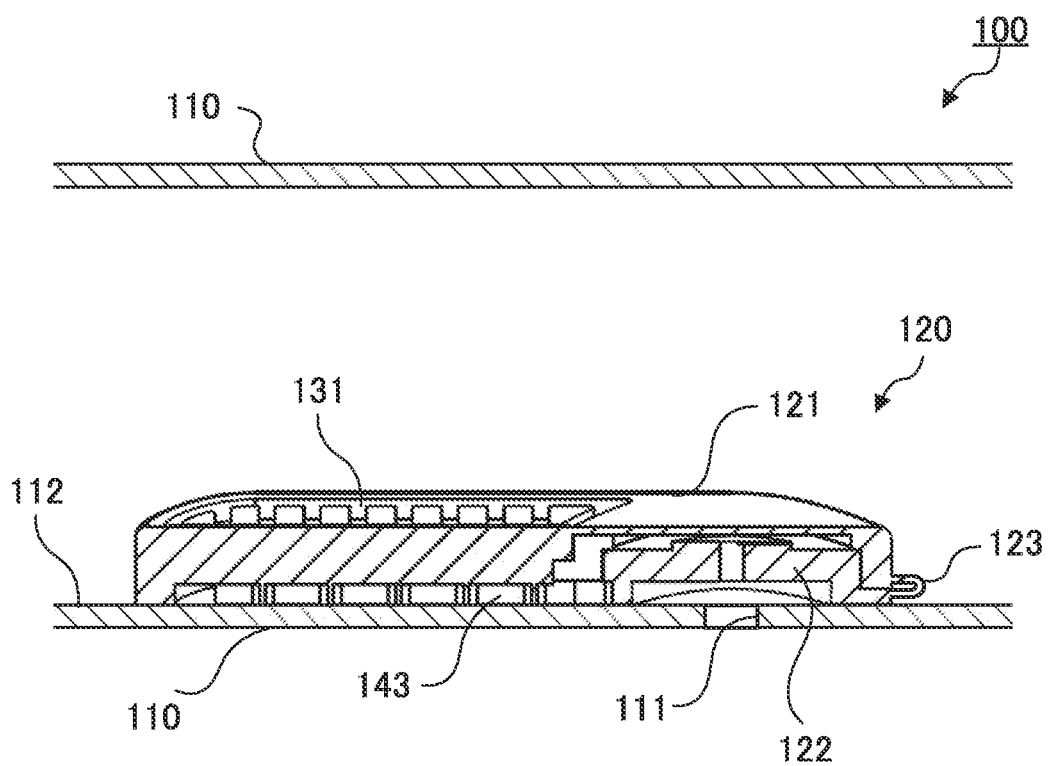
FIG. 1 is a sectional view of a drip irrigation tube according to an embodiment of the present invention.

FIG. 1 is a sectional view of drip irrigation tube 100 according to an embodiment of the present invention.

As illustrated in FIG. 1, drip irrigation tube 100 includes tube 110 and emitter 120.

Tube 110 is a tube for delivering irrigation liquid. Examples of the irrigation liquid include water, liquid fertilizer, agricultural chemicals and mixtures thereof. The flow direction of the irrigation liquid in tube 110 is not limited. In addition, the material of tube 110 is not limited. In the present embodiment, the material of tube 110 is polyethylene.

In the pipe wall of tube 110, a plurality of discharging ports 111 for discharging irrigation liquid is formed at a predetermined interval (e.g., from 200 mm to 500 mm) in the axis direction of tube 110. The diameter of the opening of discharging port 111 is not limited as long as irrigation liquid can be discharged. In the present embodiment, the diameter of the opening of discharging port 111 is 1.5 mm. Each emitter 120 is joined at a position corresponding to discharging port 111 of inner wall surface 112. The cross-sectional shape and the cross-sectional area perpendicular to the axis direction of tube 110 are not limited as long as emitter 120 can be disposed inside tube 110 without causing liquid leakage.

Drip irrigation tube 100 is produced by joining emitter 120 to inner wall surface 112 at the surface (rear surface 125) on the side joined to tube 110. The method of joining tube 110 and emitter 120 is not limited. For example, tube 110 and emitter 120 are joined by welding of the resin material of tube 110 or emitter 120, bonding with an adhesive agent, and the like. Discharging port 111 may be formed after or before tube 110 and emitter 120 are joined.

Figure 2:
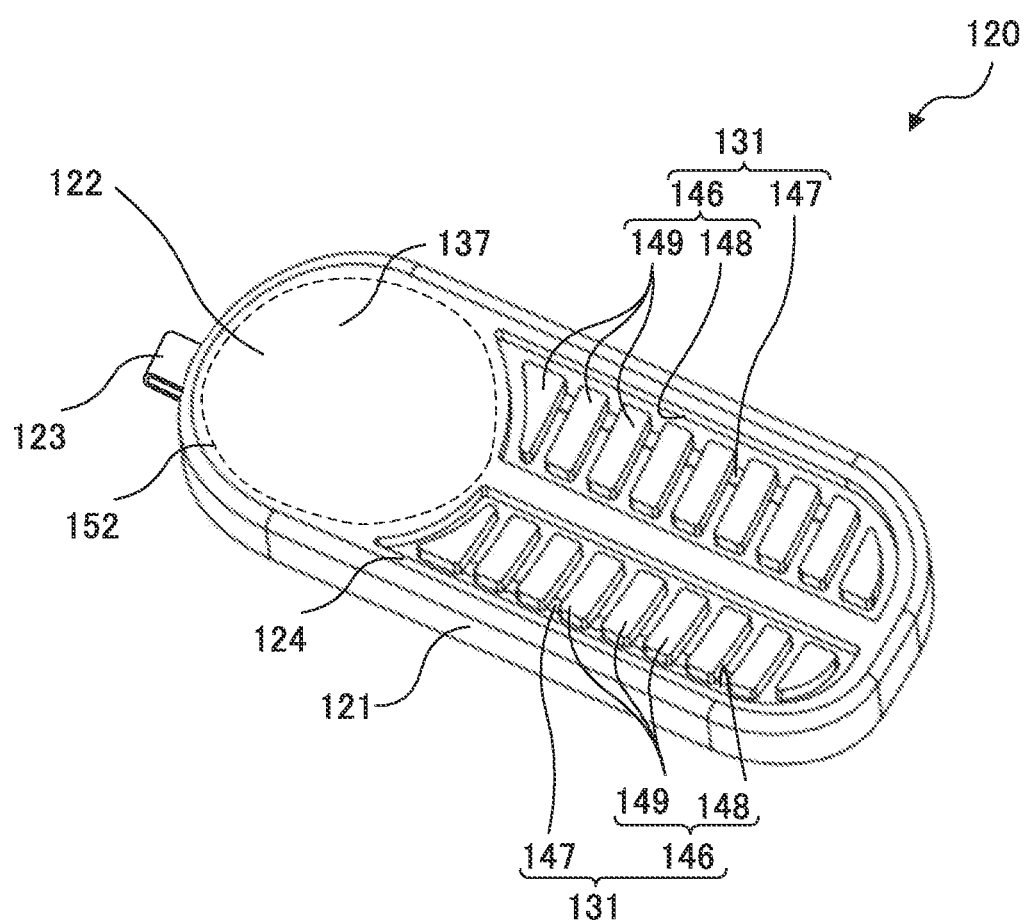
FIG. 2 is a perspective view of an emitter after a base seat is housed in a housing part as viewed from the front side (a side on which an intake part is provided)
Figure 3A:
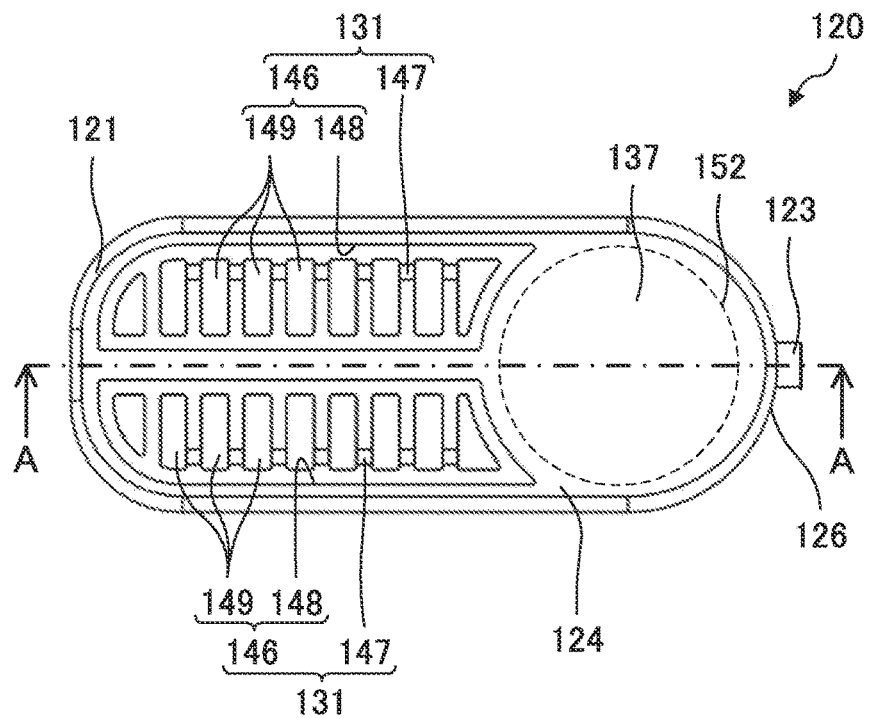
FIGS. 3A and 3B illustrate a configuration of the emitter after the base seat is housed in the housing part.
Figure 3B:
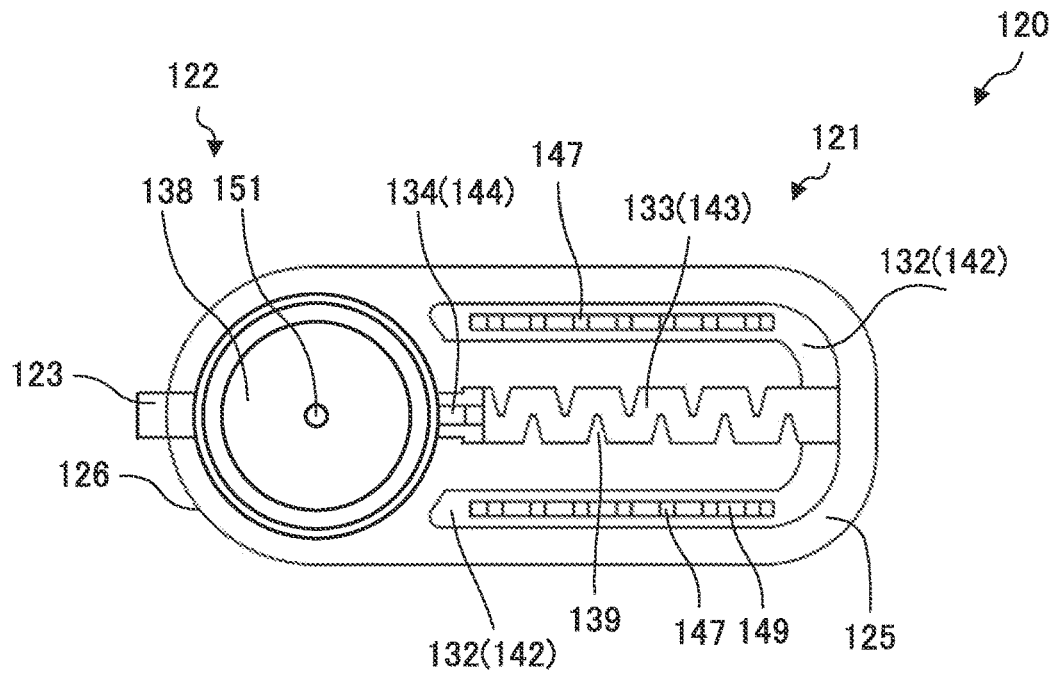
Figure 4A:
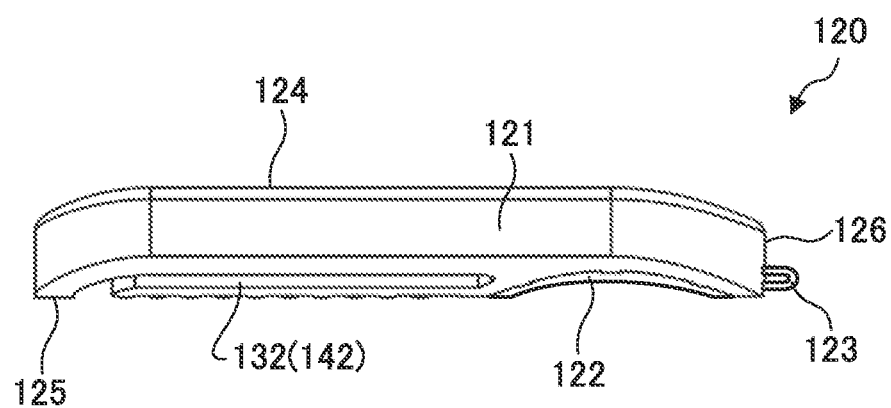
FIGS. 4A, 4B and 4C illustrate a configuration of the emitter after the base seat is housed in the housing part.
Figure 4B:
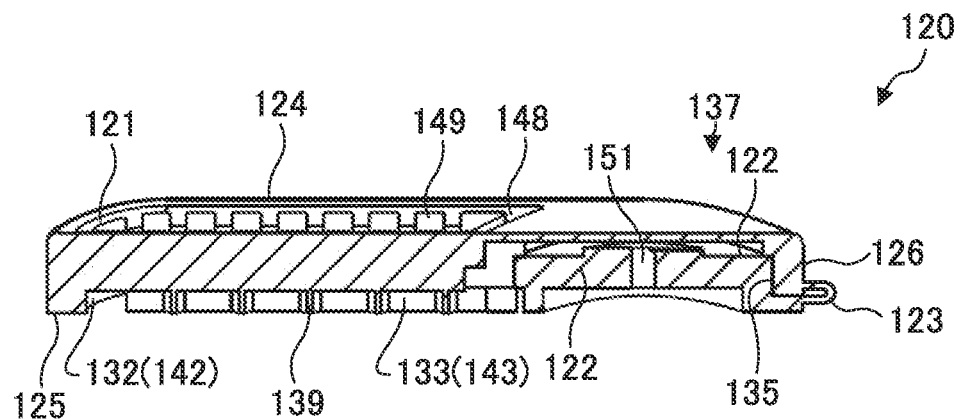
Figure 4C:
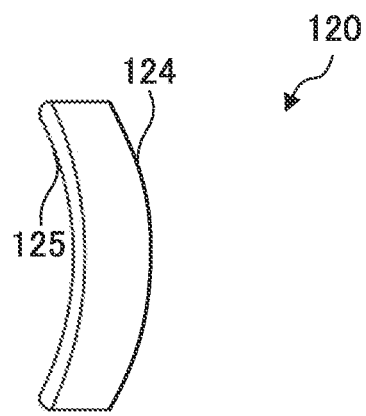

FIGS. 2 to 4C illustrate a configuration of emitter 120 according to the present embodiment after base seat 122 is housed in housing part 135. FIG. 2 is a perspective view of emitter 120 as viewed from the front side (the side on which intake part 131 is provided). FIG. 3A is a plan view of the emitter, and FIG. 3B is a bottom view of the emitter. FIG. 4A is a front view of emitter 120, FIG. 4B is a sectional view taken along line A-A of FIG. 3A, and FIG. 4C is a left side view of emitter 120.

As illustrated in FIGS. 1 to 4C, emitter 120 is joined to inner wall surface 112 of tube 110 to cover discharging port 111. The shape of emitter 120 is not limited as long as it can make intimate contact with inner wall surface 112 and cover discharging port 111. In the present embodiment, in the cross-section of emitter 120 perpendicular to the axis direction of tube 110, the rear surface to be joined to inner wall surface 112 has a substantially arc shape that matches inner wall surface 112 and protrudes toward inner wall surface 112. As illustrated in FIG. 3A, emitter 120 has a substantially rectangular shape with chamfered four corners in plan view. In the present embodiment, emitter 120 has a length of 19 mm in the long side direction, a length of 8 mm in the short side direction, and a height of 2.7 mm. The size of emitter 120 is not limited, and may be appropriately determined based on the desired discharge rate of irrigation liquid from discharging port 111.

In the present embodiment, emitter 120 is made of a material having flexibility. Examples of the material of emitter 120 include resin, elastomer and rubber. Examples of the resin include polyethylene and silicone. The flexibility of emitter 120 can be adjusted by using elastic resin materials. For example, the flexibility of emitter 120 can be adjusted by selection of elastic resins, adjustment of the proportion of an elastic resin material with respect to a hard resin material, and the like.

As illustrated in FIGS. 1 to 4C, emitter 120 includes emitter body 121 and base seat 122 housed in emitter body 121. Emitter body 121 and base seat 122 are connected to each other through hinge part 123. Before emitter 120 is joined to tube 110, base seat 122 is housed to housing part 135 of emitter body 121 from rear surface 125 side facing discharging port 111.

Emitter body 121 includes intake part 131, first connecting groove 132 serving as first connecting channel 142, pressure reducing groove (pressure reducing channel groove) 133 serving as pressure reducing channel 143, and second connecting groove 134 serving as second connecting channel 144. When base seat 122 is housed to emitter body 121, flow rate adjusting part 137 and discharging part 138 are formed. Intake part 131 opens at front surface 124 of emitter body 121. First connecting groove 132, pressure reducing groove 133, second connecting groove 134 and housing part 135 are open at rear surface 125 of emitter body 121.

When emitter 120 is joined to tube 110, first connecting groove 132, pressure reducing groove 133 and second connecting groove 134 serve as first connecting channel 142, pressure reducing channel 143 and second connecting channel 144, respectively. With this configuration, a channel composed of intake part 131, first connecting channel 142, pressure reducing channel 143, second connecting channel 144, flow rate adjusting part 137 and discharging part 138, and configured to connect intake part 131 and discharging part 138 is formed. This channel carries irrigation liquid from intake part 131 to discharging part 138.

Intake part 131 is disposed in an area that occupies more than half of front surface 124 of emitter body 121. In the present embodiment, two intake parts 131 are disposed in both end portions of emitter 120 in the minor axis direction (FIG. 3A). Flow rate adjusting part 137 is disposed in the region where intake part 131 is not disposed in front surface 124. Intake part 131 includes intake side screen part 146 and a plurality of intake through holes 147.

Intake side screen part 146 prevents entry into intake recess 148 of floating matters in irrigation liquid to be taken into emitter 120. Intake side screen part 146 is open to interior of tube 110, and includes intake recess 148 and ridge 149.

The depth of intake recess 148 is not limited, and is appropriately set in accordance with the size of emitter 120. Ridge 149 is formed on the bottom surface of intake recess 148. In addition, intake through hole 147 is formed in the bottom surface of intake recess 148.

Ridge 149 is disposed on the bottom surface of intake recess 148. The arrangement and the number of ridges 149 are not limited as long as entry of floating matters in the irrigation liquid can be prevented while taking in the irrigation liquid from the opening side of intake recess 148. In the present embodiment, ridges 149 are disposed to extend along the minor axis direction of emitter 120, and are arranged in the longitudinal axial direction of emitter 120. In addition, the distance between ridges 149 adjacent to each other is not limited as long as the above-described function can be ensured. In addition, ridge 149 may be formed such that the width decreases from front surface 124 of emitter 120 toward the bottom surface of intake recess 148, or that the width does not change from front surface 124 of emitter 120 toward the bottom surface of intake recess 148.

Intake through hole 147 is formed in the bottom surface of intake recess 148. The shape and the number of intake through hole 147 are not limited as long as the irrigation liquid taken into intake recess 148 can be taken into emitter body 121. In the present embodiment, intake through hole 147 is a single long hole formed along the longitudinal axial direction in the bottom surface of intake recess 148. The long hole of intake through hole 147 is covered with the plurality of ridges 149 and therefore appears to be divided into a plurality of through holes when viewed from the front side.

The irrigation liquid having flowed inside tube 110 is taken into emitter 120 while entry of floating matters into intake recess 148 is prevented by intake side screen part 146.

First connecting groove 132 (first connecting channel 142) connects intake through hole 147 (intake part 131) and pressure reducing groove 133. First connecting groove 132 is formed in a substantially U-shape along the outer edge of rear surface 125 of emitter 120. Pressure reducing groove 133 is connected to a portion in the vicinity of a center portion of first connecting groove 132. When tube 110 and emitter 120 are joined to each other, first connecting groove 132 and inner wall surface 112 of tube 110 form first connecting channel 142. The irrigation liquid taken from intake part 131 flows toward pressure reducing channel 143 through first connecting channel 142.

Pressure reducing groove 133 (pressure reducing channel 143) connects first connecting groove 132 (first connecting channel 142) and second connecting channel 144. Pressure reducing groove 133 (pressure reducing channel 143) guides, to flow rate adjusting part 137, the irrigation liquid taken from intake part 131 while reducing the pressure of the irrigation liquid. Pressure reducing groove 133 is disposed along the longitudinal axial direction at a center portion of rear surface 125. The upstream end of pressure reducing groove 133 is connected to first connecting groove 132, and the downstream end of pressure reducing groove 133 is connected to second connecting groove 134 communicated with flow rate adjusting part 137. The shape of pressure reducing groove 133 is not limited as long as the above-described function can be ensured. In the present embodiment, pressure reducing groove 133 has a zigzag shape in plan view. In pressure reducing groove 133, protrusions 139, each of which has a substantially triangular prism shape protruding from the inner surface, alternate along the flow direction of the irrigation liquid. Each protrusion 139 is disposed such that its tip end does not cross the central axis of pressure reducing groove 133 in plan view. When tube 110 and emitter 120 are joined to each other, pressure reducing groove 133 and the inner wall surface of tube 110 form pressure reducing channel 143. The irrigation liquid taken from intake part 131 is depressurized by pressure reducing channel 143 and is guided to flow rate adjusting part 137.

Second connecting groove 134 (second connecting channel 144) connects pressure reducing groove 133 (pressure reducing channel 143) and flow rate adjusting part 137. Second connecting groove 134 is a groove formed on rear surface 125 side of emitter 120 in a straight line shape along the longitudinal axial direction of emitter 120. The upstream end of second connecting groove 134 is connected to pressure reducing groove 133, and the downstream end of second connecting groove 134 is connected to flow rate adjusting part 137 (housing part 135). When tube 110 and emitter 120 are joined to each other, second connecting groove 134 and inner wall surface 112 of tube 110 form second connecting channel 144. The irrigation liquid depressurized by pressure reducing channel 143 flows toward flow rate adjusting part 137 through second connecting channel 144.

Figure 5:
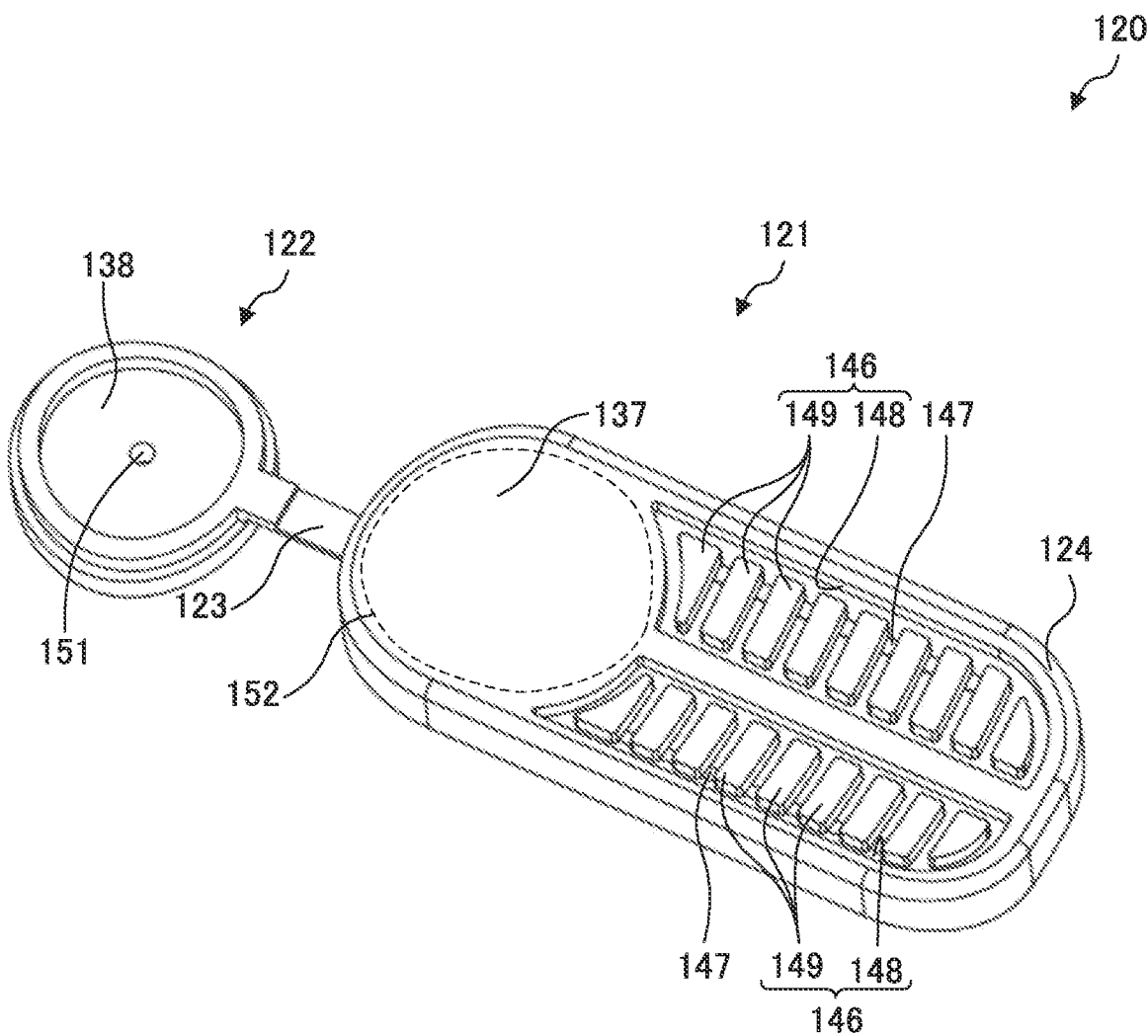
FIG. 5 is a perspective view of the emitter before the base seat is housed in the housing part as viewed from the front side.
Figure 6A:
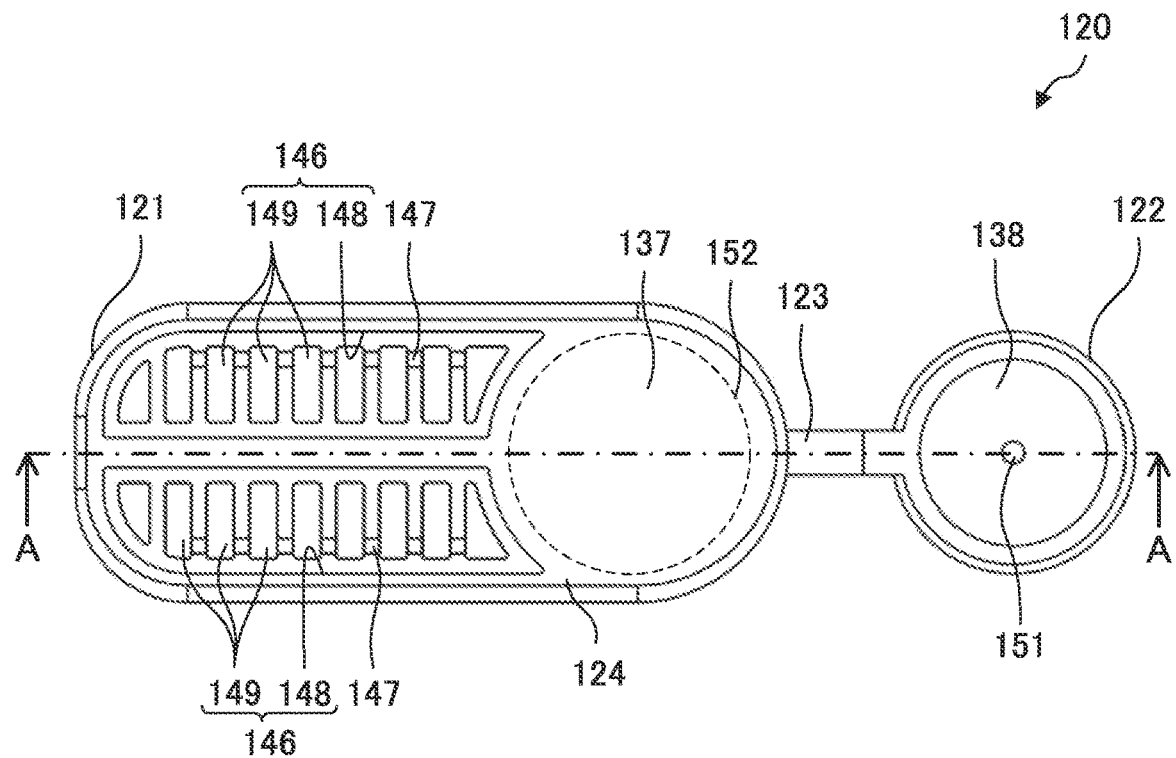
FIGS. 6A and 6B illustrate a configuration of the emitter before the base seat is housed in the housing part.
Figure 6B:
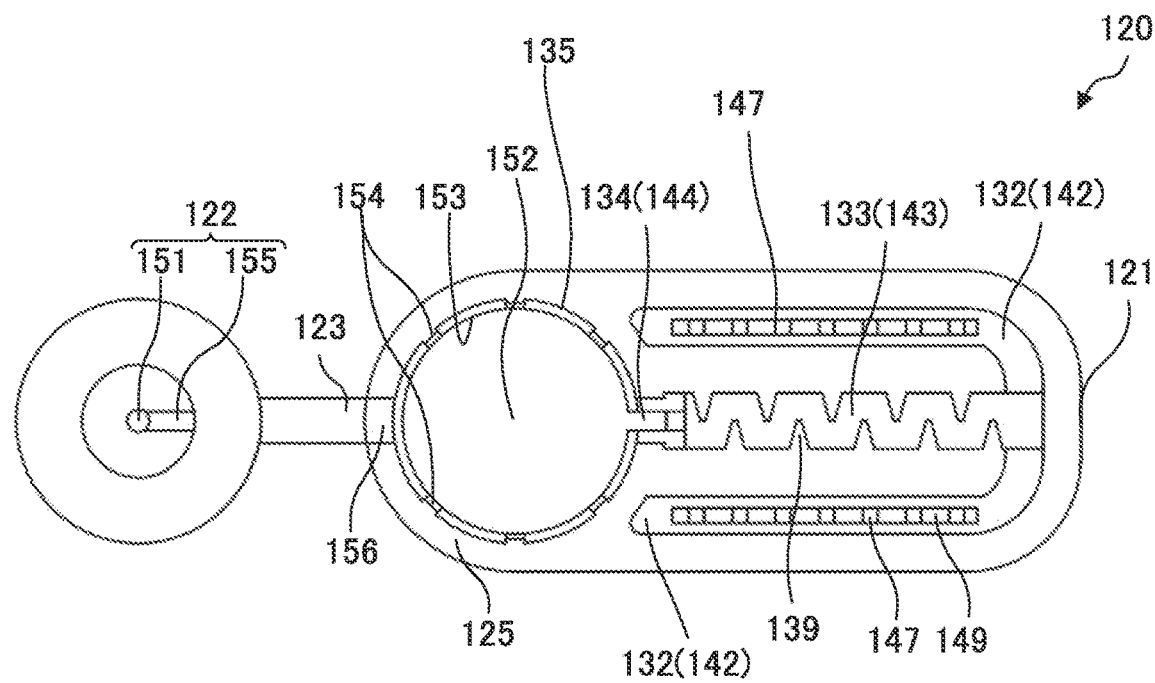
Figure 7A:
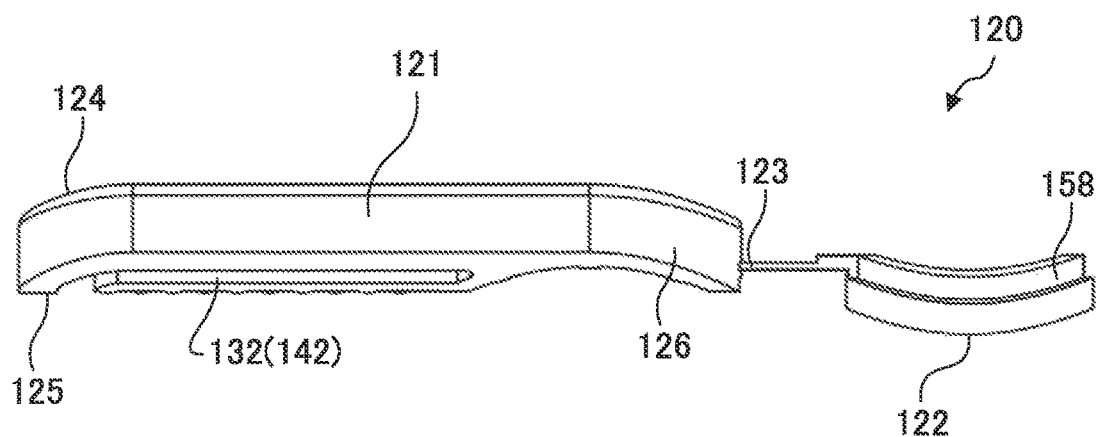
FIGS. 7A, 7B and 7C illustrate a configuration of the emitter before the base seat is housed in the housing part.
Figure 7B:
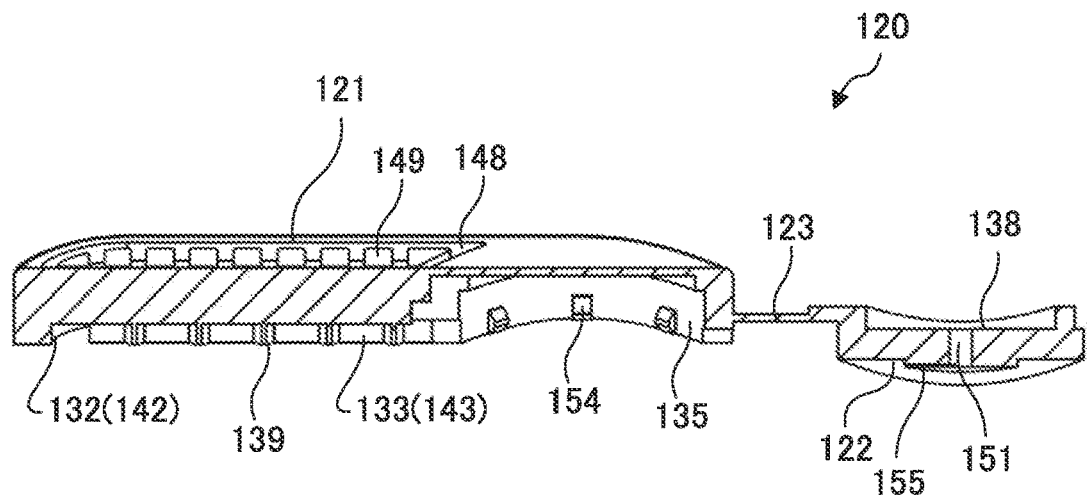
Figure 7C:
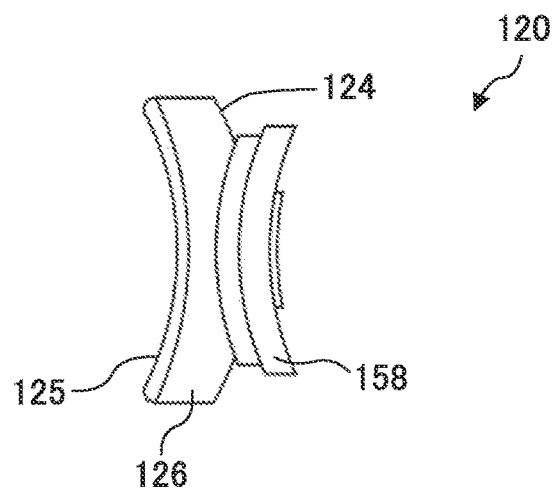

FIGS. 5 to 7C illustrate a configuration of emitter 120 before the base seat is housed in the housing part. FIG. 5 is a perspective view of emitter 120 before the base seat is housed in the housing part as viewed from the front side. FIG. 6A and FIG. 6B are a plan view and a bottom view of the emitter before the base seat is housed in the housing part. FIG. 7A is a front view of emitter 120 before the base seat is housed in the housing part, FIG. 7B is a sectional view taken along line A-A of FIG. 6A, and FIG. 7C is a right side view of that emitter 120.

Flow rate adjusting part 137 adjusts the flow rate of incoming irrigation liquid. Flow rate adjusting part 137 is disposed in a region where intake part 131 is not provided in emitter 120. As illustrated in FIGS. 5 to 7C, flow rate adjusting part 137 includes housing part 135, base seat 122, communication hole 151 and diaphragm part 152.

Housing part 135 is a recess having a substantially columnar shape. When emitter 120 is joined to tube 110, housing part 135 opens at the surface of emitter body 121 on the side joined to tube 110. Protrusion 154 for fixing base seat 122 is disposed at inner peripheral surface 153 of housing part 135. The number of protrusions 154 is not limited as long as the above-described function can be ensured. In the present embodiment, six protrusions 154 are provided. Likewise, the shape of protrusion 154 is not limited as long as the above-described function can be ensured. In the present embodiment, protrusion 154 has a substantially trapezoidal columnar shape. In housing part 135, base seat 122 (see FIG. 1) is disposed for the purpose of adjusting the discharge amount, from discharging port 111 of tube 110, of irrigation liquid having flowed from second connecting channel 144. After base seat 122 is disposed in housing part 135 and fixed by protrusion 154, emitter 120 is joined to inner wall surface 112 of tube 110.

Base seat 122 is an annular member. Base seat 122 includes communication hole 151 communicated with discharging part 138 (see FIG. 1) that opens at rear surface 125 of emitter body 121 and faces discharging port 111 of tube 110 when emitter 120 is joined to tube 110, and a single connecting groove 155 that connects the outer periphery side of base seat 122 and communication hole 151.

As illustrated in FIG. 1, when emitter 120 is joined to inner wall surface 112 of tube 110, base seat 122 disposed in housing part 135 and diaphragm part 152 facing the top surface of base seat 122 form flow rate adjusting part 137 for adjusting the flow rate of the irrigation liquid discharged from communication hole 151 of emitter 120 (base seat 122) in accordance with the pressure of the irrigation liquid in tube 110. In the present embodiment, diaphragm part 152 has a circular shape in plan view. In the present embodiment, diaphragm part 152 is integrally molded in one piece including other components of emitter body 121 (intake part 131, first and second connecting channels 142 and 144, pressure reducing channel 143 and the like). Emitter 120 including diaphragm part 152 is produced by injection molding, for example.

Diaphragm part 152 is integrally molded in one piece including other components of emitter 120, and thus has flexibility. In the state where emitter 120 is joined to inner wall surface 112 of tube 110, diaphragm part 152 is deformed toward the top surface side of base seat 122 (the surface of base seat 122 on the side opposite to diaphragm part 152) by the pressure of the irrigation liquid in tube 110.

Hinge part 123 connects emitter body 121 and base seat 122. The shape and the size of hinge part 123 may be appropriately set as long as the above-described function can be ensured. In the present embodiment, hinge part 123 is connected to side surface 126 contiguous with rear surface 125. Hinge part 123 may be disposed at the side surface in the longitudinal axial direction (the flow direction of the irrigation liquid) of emitter body 121, or may be disposed at side surface 126 in the minor axis direction of emitter body 121. Preferably, to prevent blockage of the flow of the irrigation liquid, hinge part 123 is connected to side surface 126 on the upstream side or the downstream side in the flow direction of the irrigation liquid.

Hinge part 123 is bent when housing base seat 122 into housing part 135, and is not separated from emitter body 121 and base seat 122. In addition, as described above, rear surface 125 of emitter 120 is joined to inner wall surface 112 of tube 110. In view of this, in the present embodiment, for the purpose of appropriately joining the rear side surface of emitter 120 to inner wall surface 112 of tube 110, groove 156 for housing hinge part 123 is formed in rear surface 125 of emitter body 121.

When joining emitter 120 to tube 110, groove 156 houses hinge part 123. The shape of groove 156 is not limited as long as hinge part 123 can be housed. In the present embodiment, the width of groove 156 is slightly smaller than the width of hinge part 123. When joining emitter 120 to tube 110, base seat 122 is housed in housing part 135 and hinge part 123 is housed in groove 156. At this time, hinge part 123 is housed by press-fitting it into groove 156 because the width of groove 156 is slightly smaller than the width of hinge part 123.

Now an operation of diaphragm part 152 in accordance with the pressure of the irrigation liquid in tube 110 is described.

Before irrigation liquid is fed into tube 110, the pressure of the irrigation liquid is not applied to diaphragm part 152, and therefore diaphragm part 152 is not deformed (see FIG. 1).

When feeding of irrigation liquid into tube 110 is started, the pressure of the irrigation liquid in tube 110 begins to be increased, and diaphragm part 152 begins to be deformed. When the pressure of the irrigation liquid is relatively low, deformation of diaphragm part 152 is relatively small, and diaphragm part 152 does not make contact with the top surface of base seat 122. In this state, communication hole 151 of base seat 122 is not closed, and therefore the irrigation liquid having flowed through the space between diaphragm part 152 and the top surface of base seat 122 from second connecting channel 144 is discharged from communication hole 151 toward discharging part 138.

When the pressure of the irrigation liquid exceeds a set value, diaphragm part 152 is further deformed, and diaphragm part 152 makes intimate contact with the top surface of base seat 122. Note that, even when diaphragm part 152 is in intimate contact with the top surface of base seat 122, connecting groove 155 of base seat 122 is not closed. Therefore, the irrigation liquid having flowed from second connecting channel 144 flows through connecting groove 155 so as to be discharged from communication hole 151. Thus, even when diaphragm part 152 is in intimate contact with the top surface of base seat 122, irrigation liquid of a given amount or greater is discharged toward discharging part 138.

With this configuration, regardless of the pressure of the irrigation liquid in tube 110, irrigation liquid of a given amount or greater can be reliably discharged from communication hole 151. That is, drip irrigation tube 100 according to the present embodiment can discharge irrigation liquid of a given amount or greater to the outside of tube 110 regardless of whether the pressure of the irrigation liquid is high or low.

Note that the width of connecting groove 155 is not limited. The width of connecting groove 155 may be determined based on a desirable amount of the irrigation liquid to be discharged from communication hole 151 when the pressure of the irrigation liquid exceeds a set value, for example.

Effect

As described above, emitter 120 according to the present embodiment includes intake part 131 that is communicated with the interior of tube 110 when emitter 120 is joined to tube 110, a pressure reducing channel part (pressure reducing groove 133) that forms a pressure reducing channel (pressure reducing channel 143) that carries the irrigation liquid while reducing the pressure of the liquid, a flow rate adjusting part (base seat 122 and diaphragm part 152) that adjusts the flow rate of the irrigation liquid in accordance with the pressure of the irrigation liquid in tube 110, and discharging part 138 that faces discharging port 111 when emitter 120 is joined to tube 110. The flow rate adjusting part includes base seat 122, housing part 135 that houses base seat 122, communication hole 151 that opens at base seat 122 and is communicated with discharging part 138, and a diaphragm part (diaphragm part 152) having flexibility and disposed apart from base seat 122 to approach base seat 122 when receiving the pressure of the irrigation liquid in tube 110. The diaphragm part is connected to the emitter body through a hinge part.

With this configuration, emitter 120 according to the present embodiment can be produced at a reduced cost in comparison with a conventional case where a diaphragm part is formed such that a flap that is movable with respect to an emitter body is integrally molded with the emitter body, and the flap is rotated about the hinge and engaged with the emitter body by bonding or welding, for example. To be more specific, the process of engaging the flap to the emitter body by bonding or welding can be omitted, and thus production cost can be reduced.

In addition, in the present embodiment, emitter 120 can be joined to inner wall surface 112 of tube 110 through a simple process of putting base seat 122 to housing part 135 without joining base seat 122 to the emitter body (housing part 135) by bonding or welding, and thus the production cost can be reduced in comparison with the case where base seat 122 is joined to the emitter body (housing part 135) by bonding or welding. Furthermore, with the hinge part provided in emitter 120, welding between emitter 120 and inner wall surface 112 of tube 110 is further strengthened in the process of joining emitter 120 and inner wall surface 112 of tube 110.

That is, in the present embodiment, emitter 120 can be joined to inner wall surface 112 of tube 110 through a simple process of putting base seat 122 to housing part 135 without joining base seat 122 to the emitter body (housing part 135) by bonding or welding, the production cost can be reduced in comparison with the case where the above-mentioned clearance is ensured by joining base seat 122 to the emitter body (housing part 135) by bonding or welding.

This application is entitled to and claims the benefit of Japanese Patent Application No. 2018-101332 filed on May 28, 2018, the disclosure each of which including the specification, drawings and abstract is incorporated herein by reference in its entirety.

INDUSTRIAL APPLICABILITY

According to the present invention, an emitter capable of adjusting the flow rate of output liquid can be provided at a reduced production cost. Accordingly, application of the above-mentioned emitter to technical fields such as drip irrigation and endurance test that require long-term dropping, and further development in the technical field are expected.

REFERENCE SIGNS LIST

100 Drip irrigation tube
110 Tube
111 Discharging port
112 Inner wall surface
120 Emitter
121 Emitter body
122 Base seat
123 Hinge part
131 Intake part
132 First connecting groove
133 Pressure reducing groove
134 Second connecting groove
135 Housing part
137 Flow rate adjusting part
138 Discharging part
139 Protrusion
142 First connecting channel
143 Pressure reducing channel
144 Second connecting channel
146 Intake side screen part
147 Intake through hole
148 Intake recess
149 Ridge
151 Communication hole
152 Diaphragm part
153 Inner peripheral surface
154 Protrusion
155 Connecting groove

The invention claimed is:

1. An emitter configured to be joined to an inner wall surface of a tube for delivering irrigation liquid at a position corresponding to a discharging port communicating between inside and outside of the tube, the emitter being configured to quantitatively discharge the irrigation liquid in the tube from the discharging port to the outside of the tube, the emitter comprising:
   an emitter body; and
   a base seat configured to be housed in the emitter body,
   wherein the emitter body includes:
      an intake part configured to take in the irrigation liquid,
      a pressure reducing channel groove communicated with the intake part and configured to form a pressure reducing channel for carrying the irrigation liquid while depressurizing the irrigation liquid,
      a housing part communicated with the pressure reducing channel groove and configured to house the base seat, and
      a diaphragm part having flexibility and configured to approach the base seat when receiving a pressure of the irrigation liquid in the tube in a state where the base seat is housed in the housing part,
   wherein the base seat includes a through hole configured to discharge, toward the discharging port, the irrigation liquid carried into the housing part from the pressure reducing channel groove,
   wherein the emitter body and the base seat are connected to each other through a hinge part,
   wherein when the emitter is joined to the tube, the housing part is open at a surface of the emitter body on a side on which the emitter body is joined to the tube,
   wherein the hinge part is connected to a side surface of the emitter body, the side surface being contiguous with the surface of the emitter body on the side on which the emitter body is joined to the tube, and
   wherein in the surface of the emitter body on the side on which the emitter body is joined to the tube, a groove configured to connect an inner peripheral surface of the housing part and the side surface and to house the hinge part in a press-fit manner is formed.

2. The emitter according to claim 1, wherein when the emitter is joined to the tube, the hinge part is connected to the emitter body at a side surface located on an upstream side or a downstream side in the emitter body in a direction in which in the irrigation liquid flows in the tube.

3. The emitter according to claim 1, wherein the emitter body, the base seat and the hinge part are integrally molded in one piece.

4. The emitter according to claim 2, wherein the emitter body, the base seat and the hinge part are integrally molded in one piece.

5. A drip irrigation tube comprising:
   a tube for delivering irrigation liquid, the tube including a discharging port communicating between inside and outside of the tube; and
   an emitter joined to an inner wall surface of the tube at a position corresponding to the discharging port, the emitter being configured to quantitatively discharge the irrigation liquid in the tube from the discharging port to the outside of the tube,
   wherein the emitter comprises:
      an emitter body; and
      a base seat configured to be housed in the emitter body,
   wherein the emitter body includes:
      an intake part configured to take in the irrigation liquid,
      a pressure reducing channel groove communicated with the intake part and configured to form a pressure reducing channel for carrying the irrigation liquid while depressurizing the irrigation liquid,
      a housing part communicated with the pressure reducing channel groove and configured to house the base seat, and
      a diaphragm part having flexibility and configured to approach the base seat when receiving a pressure of the irrigation liquid in the tube in a state where the base seat is housed in the housing part,
   wherein the base seat includes a through hole configured to discharge, toward the discharging port, the irrigation liquid carried into the housing part from the pressure reducing channel groove,
   wherein the emitter body and the base seat are connected to each other through a hinge part,
   wherein the housing part is open at a surface of the emitter body on a side on which the emitter body is joined to the tube,
   wherein the hinge part is connected to a side surface of the emitter body, the side surface being contiguous with the surface of the emitter body on the side on which the emitter body is joined to the tube, and
   wherein in the surface of the emitter body on the side on which the emitter body is joined to the tube, a groove configured to connect an inner peripheral surface of the housing part and the side surface and to house the hinge part in a press-fit manner is formed.

* * * * *